United States Patent
Kaigawa

(10) Patent No.: US 11,062,186 B2
(45) Date of Patent: Jul. 13, 2021

(54) INFORMATION-PROCESSING DEVICE EXECUTING SELECTIVE ONE OF SWAP MODE AND COPY MODE

(71) Applicant: BROTHER KOGYO KABUSHIKI KAISHA, Nagoya (JP)

(72) Inventor: Shinsuke Kaigawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/809,815

(22) Filed: Mar. 5, 2020

(65) Prior Publication Data
US 2020/0311499 A1 Oct. 1, 2020

(30) Foreign Application Priority Data
Mar. 28, 2019 (JP) .............................. JP2019-063328

(51) Int. Cl.
*G06K 15/00* (2006.01)
(52) U.S. Cl.
CPC .......... *G06K 15/402* (2013.01); *G06K 15/005* (2013.01)
(58) Field of Classification Search
CPC .......................... G06K 15/405; G06K 15/005
See application file for complete search history.

(56) References Cited

U.S. PATENT DOCUMENTS

| | | | |
|---|---|---|---|
| 2009/0262382 A1* | 10/2009 | Nobutani | H04L 41/0806 358/1.15 |
| 2014/0022591 A1* | 1/2014 | Asahara | G06K 15/402 358/1.15 |

FOREIGN PATENT DOCUMENTS

| JP | 2007-094155 A | 4/2007 |
|---|---|---|
| JP | 2010-220121 A | 9/2010 |
| JP | 4622926 B2 | 2/2011 |

* cited by examiner

*Primary Examiner* — Ibrahim Siddo
(74) *Attorney, Agent, or Firm* — Scully, Scott, Murphy & Presser, PC

(57) ABSTRACT

In an information-processing device, a controller operates according to setting information. The controller executes selective one of a swap mode and a copy mode. The swap mode is for moving the setting information from one device to another device. The copy mode is for copying the setting information from one device to one or more devices. While a removable medium is connected to the input-output interface: the controller performs; in a swap-mode case where the swap mode is executed, storing in the removable medium the setting information currently stored in the memory and overwriting the setting information in the memory to prescribed initial setting information; and in a copy-mode case where the copy mode is executed, storing in the removable medium the setting information currently stored in the memory while maintaining the current setting information in the memory.

17 Claims, 12 Drawing Sheets

FIG. 2

SETTING INFORMATION (Backup.json)

─220

INSTALLATION SITE: Team1
CONTACT ADDRESS: team1@mail.co.jp

IP Address: 123.456.123.456
MailServer: 123.123.123.456

SCAN SETTINGS
  DISPLAY NAME: ScanToMike
  DESTINATION INFORMATION: 123.123.123.123
  SCANNING RESOLUTION: 300dpi
  DUPLEX SCAN SETTING: ON
  COLOR SETTING: ON COPY SETTINGS
  DISPLAY NAME: Copy1
  SCANNING RESOLUTION: 200dpi
  DUPLEX SCAN SETTING: ON
  COLOR SETTING: ON
  DUPLEX PRINT SETTING: ON

INFORMATION-PROCESSING DEVICE EXECUTING SELECTIVE ONE OF SWAP MODE AND COPY MODE

CROSS REFERENCE TO RELATED APPLICATION

This application claims priority from Japanese Patent Application No. 2019-063328 filed Mar. 28, 2019. The entire content of the priority application is incorporated herein by reference.

TECHNICAL FIELD

The present disclosure relates to a technology for acquiring setting information from an external storage device or for storing setting information in an external storage device.

BACKGROUND

There is known in the art a technology by which an image-forming device stores in an external storage device setting information including device settings data which is stored in its own storage. Further, another image-forming device can read the setting information stored in this external storage device and restore its own setting information.

SUMMARY

However, there are various purposes for setting information stored in an external storage device. For example, the stored setting information may be copied to the storages of a plurality of image-forming devices or may simply be transferred to an image-forming device.

However, the conventional image-forming device described above does not perform a control process that is sufficiently flexible for a plurality of purposes.

In view of the foregoing, it is an object of the present disclosure to provide a technology for modifying the operations of an image-forming device based on the purpose of setting information when storing the setting information in an external storage device or when acquiring the setting information from an external storage device.

In order to attain the above and other objects, the disclosure provides an information-processing device. The information-processing device includes a memory, an input-output interface, and a controller. The memory is configured to store setting information including an operation setting for the information-processing device. The controller is configured to operate according to the setting information. The controller executes selective one of a swap mode and a copy mode. The swap mode is for moving the setting information from one device to another device. The copy mode is for copying the setting information from one device to one or more devices. While a removable medium is connected to the input-output interface, the controller is configured to perform: in a swap-mode case where the swap mode is executed, storing in the removable medium the setting information currently stored in the memory and overwriting the setting information in the memory to prescribed initial setting information; and in a copy-mode case where the copy mode is executed, storing in the removable medium the setting information currently stored in the memory while maintaining the current setting information in the memory.

According to another aspect, the disclosure provides an information-processing device. The information-processing device includes a memory, an input-output interface, and a controller. The memory is configured to store setting information including an operation setting for the information-processing device. The controller is configured to operate according to the setting information. The controller executes selective one of a swap mode and a copy mode. The swap mode is for moving the setting information from one device to another device. The copy mode is for copying the setting information from one device to one or more devices. While a removable medium is connected to the input output interface and stores setting information for import, the controller is configured to perform: in a swap-mode case where the swap mode is executed, importing the setting information for import from the removable medium to the memory and deleting the setting information from the removable medium; and in a copy-mode case where the copy mode is executed, importing the setting information for import from the removable medium to the memory while maintaining the setting information in the removable medium.

According to still another aspect, the disclosure provides a method for controlling an information-processing device including: a memory configured to store setting information including an operation setting for the information-processing device; an input-output interface; and a controller. The method includes: executing selective one of a swap mode and a copy mode, the swap mode being for moving the setting information from one device to another device, the copy mode being for copying the setting information from one device to one or more devices; and while a removable medium is connected to the input-output interface: in a swap-mode case where the swap mode is executed, storing in the removable medium the setting information currently stored in the memory and overwriting the setting information in the memory to prescribed initial setting information; and in a copy-mode case where a copy mode is executed is executed, storing in the removable medium the setting information currently stored in the memory while maintaining the current setting information in the memory.

BRIEF DESCRIPTION OF THE DRAWINGS

The particular features and advantages of the disclosure as well as other objects will become apparent from the following description taken in connection with the accompanying drawings, in which:

FIG. 2 is an explanatory diagram illustrating a sample of setting information stored in a USB memory;

DETAILED DESCRIPTION

Figure 1:
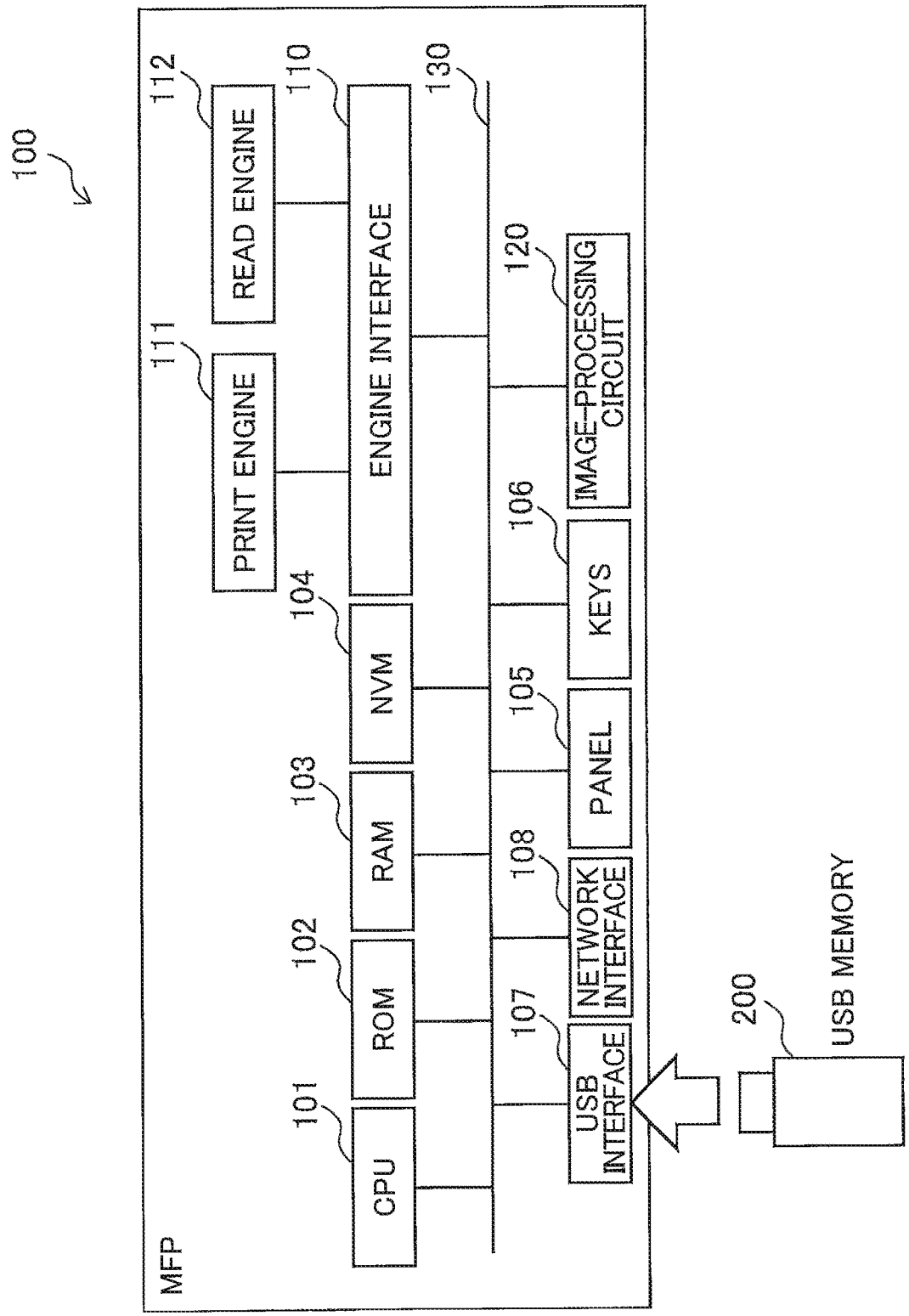
FIG. 1 is a block diagram showing a control structure of a multifunction peripheral according to an embodiment.

FIG. 1 is a block diagram showing a control structure of a multifunction peripheral 100 according to an embodiment that applies an information processing device of the present disclosure. Hereinafter, the multifunction peripheral 100 will be abbreviated as the MFP 100.

As shown in FIG. 1, the MFP 100 is provided with a central processing unit (CPU) 101, a read-only memory (ROM) 102, a random-access memory (RAM) 103, and a non-volatile memory (NVM) 104.

The CPU 101 handles overall control of the MFP 100. In the embodiment, the CPU 101 controls a print engine 111 and a read engine 112 via an engine interface 110 according to setting information. The setting information, the engine interface 110, the print engine 111, and the read engine 112 will be described later.

The ROM 102 is a memory that stores a control program executed by the CPU 101. The CPU 101 executes various processes after reading the control program stored in the ROM 102.

The RAM 103 is a memory that temporarily stores image data and the like. The CPU 101 also uses the RAM 103 as a storage area for temporarily storing data, signals, and the like used for executing the control program or as a work area for data processing.

The NVM 104 is a non-volatile memory for storing setting information and the like.

The MFP 100 is further provided with a panel 105, and keys 106. The panel 105 and the keys 106 are examples of an input device receiving information inputted by an operator.

The panel 105 is a touchscreen in the embodiment. Various screens are displayed on the panel 105 based on the status of the MFP 100. The operator can perform input operations on the panel 105 by pressing input buttons on the screen (such as buttons 105a and 105b shown in FIG. 4; described later).

The keys 106 are hard keys, i.e., keys configured by hardware. Some typical examples of hard keys include a power switch and a reset switch (both of which are not shown in the drawings), and a Start key 106a and a Stop key 106b shown in FIG. 4 (described later).

The MFP 100 is further provided with a Universal Serial Bus (USB) interface 107, and a network interface 108.

The USB interface 107 is an IO interface having functions to connect the MFP 100 to an external USB device. In the embodiment, a USB memory 200 as a removable medium is connected to the USB interface 107. The USB memory is frequently called USB flash memory as a removable data storage or a USB flash drive.

The network interface 108 functions to connect the MFP 100 to a communication network. The communication network includes at least one of a wired local area network (LAN) and a wireless LAN.

The MFP 100 is also provided with the engine interface 110. The print engine 111 and the read engine 112 are connected to the engine interface 110.

The print engine 111 functions to print images on sheets and includes a printing device according to an electrophotographic, inkjet, or thermal type method.

The read engine 112 functions to read images from originals and includes a reading device such as a charge coupled devices (CCDs), or a contact image sensor (CIS).

The engine interface 110 is a control circuit for controlling the print engine 111 and the read engine 112. The CPU 101 controls the print engine 111 and the read engine 112 through the engine interface 110.

The engine interface 110 is an interface for controlling the print engine 111 and the read engine 112.

The MFP 100 is also provided with an image-processing circuit 120.

The image-processing circuit 120 executes a rasterization process on image data for a print job, and outputs the rasterized image data to the print engine 111. The image-processing circuit 120 converts image data read from an original by the read engine 112 to digital data, and transmits the digital data externally via the network interface 108 or provides the print engine 111 with the digital data to print an image on a sheet.

The CPU 101, the ROM 102, the RAM 103, the NVM 104, the panel 105, the keys 106, the USB interface 107, the network interface 108, the engine interface 110, and the image-processing circuit 120 are all interconnected via a bus 130.

In the embodiment, setting information stored in the NVM 104 of the MFP 100 can be exported to the USB memory 200 connected to the MFP 100 via the USB interface 107. When the USB memory 200 is subsequently connected to a different MFP, the exported setting information can be imported into the other MFP. Note that all of the MFPs used in the embodiment (an MFP 100A, an MFP 100B, and an MFP 100C described later) have the same configuration as the MFP 100.

FIG. 2 shows an example of setting information 220 stored in the USB memory 200. The setting information 220 shown in FIG. 2 constitutes setting information that is currently stored in an NVM 104A of the MFP 100A described later, for example, and that has been exported to the USB memory 200. When exported to the USB memory 200, the setting information 220 is stored in the JavaScript (registered trademark) Object Notation (JSON) in the embodiment. Naturally, the format in which setting information 220 is stored is not limited to JSON, but may be another format such as the comma-separated values (CSV) format. The setting items in the setting information 220 include at least one of the installation site of the MFP 100A, the contact address for the operator of the MFP 100A, the IP address of the MFP 100A, the IP address of the server or other external device to which the MFP 100A is connected, scan settings, and copy settings. Setting information 220 for import is information that an operator can modify when logged in to the MFP 100A.

The exported setting information 220 is stored in the USB memory 200 under the filename "Backup.json," for example.

The setting information 220 in the example of FIG. 2 includes setting values for setting items, such as, the installation site "Team1" for the MFP 100A, the contact address "team1@mail.co.jp" for the operator of the MFP 100A, the IP address "123.456.123.456" of the MFP 100A, the IP address "123.123.123.456" of the mail server, scan settings, and copy settings.

The scan settings are settings for processes involving the read engine 112. The scan settings in the example of FIG. 2 include the display name "ScanToMike," the destination information "123.123.123.123," the scanning resolution "300 dpi," the duplex scan setting "ON," and the color setting "ON."

The display name is information for displaying a configuration name on a panel 105A of the MFP 100A.

The destination information is an address for transmitting image data for a scanned image to a communication network via the network interface 108. The destination information is not limited to an IP address, used in the example of FIG. 2, but may be a URL or an e-mail address.

The duplex scan setting is an option for scanning images from both surfaces of an original. A duplex scan setting of "ON" indicates that the option is enabled, while a setting of "OFF" indicates that the option is disabled and signifies a setting for scanning an image from only one surface of the original.

The color setting is an option for reading color images from the original. A color setting of "ON" indicates that the option is enabled, while a setting of "OFF" indicates that the option is disabled and signifies a setting to read images in monochrome from the original.

The CPU 101 displays "ScanToMike" on the panel 105 as the configuration name based on the setting "Display name: ScanToMike." Here, the setting information of FIG. 2 described above that corresponds to "Display name: ScanToMike" indicates setting information for settings that the operator can select from a plurality of settings displayed on the panel 105. However, the present disclosure is not limited to this configuration, and the setting information may be for settings that are fixed for a MFP. "Fixed" denotes that the operator is restricted or prohibited from selecting other settings.

The CPU 101 transmits image data read by the read engine 112 to the IP address 123.123.123.123 based on the scan destination information "123.123.123.123." The CPU 101 controls the read engine 112 to read an image at a resolution of 300 dpi based on the scanning resolution "300 dpi." The CPU 101 controls the read engine 112 to read images from both surfaces of the original based on the duplex scan setting "ON." The CPU 101 controls the read engine 112 to read color images from one or both surfaces of the original based on the color setting "ON."

Copy settings are settings for processes involving the read engine 112 and the print engine 111. In the example of FIG. 2, the copy settings include the display name "Copy1," the scanning resolution "200 dpi," the duplex scan setting "ON," the color setting "ON," and the duplex print setting "ON."

The color setting indicates an option for forming color images on sheets. A setting of "ON" indicates that the option is enabled, while a setting of "OFF" indicates that the option is disabled and signifies a setting for forming monochromatic images on sheets.

The duplex print setting is an option for forming images on both surfaces of a sheet. A setting of "ON" indicates that the option is enabled, while a setting of "OFF" indicates that the option is disabled and signifies a setting for forming images on only one surface of the sheets.

The CPU 101 controls the print engine 111 to form color images on sheets based on the copy setting "Color: On." The CPU 101 controls the print engine 111 to form images on both surfaces of sheets based on the copy setting "Duplex print: On."

FIGS. 3(a)-3(d) show how setting information is exported from one MFP and imported into another MFP. Hereinafter, the mode for exporting and importing setting information will be called the "configuration mode." In the embodiment, the configuration mode includes a swap mode and a copy mode. The MFPs execute different operations for the swap mode and the copy mode.

Figure 3A:
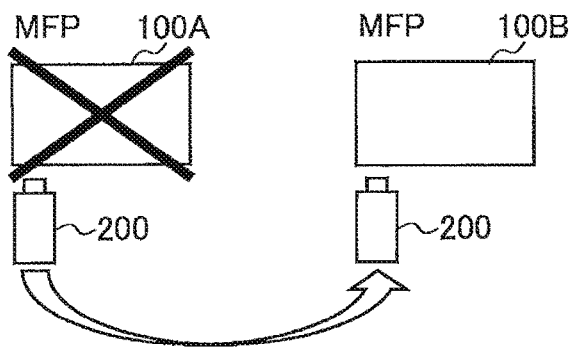
FIG. 3(a) is an explanatory diagram illustrating how setting information is exported from a multifunction peripheral and imported to another multifunction peripheral according to a swap mode.

The swap mode is a configuration mode for exporting setting information from one MFP and importing the exported setting information to another MFP for the purpose of switching from the first MFP to the other. FIG. 3(a) illustrates the process performed when the swap mode has been selected. In this example, setting information for the MFP 100A is exported and stored in the USB memory 200, and the setting information stored in the USB memory 200 is subsequently imported into the MFP 100B. In the swap mode, setting information stored in the NVM 104A of the MFP 100A is initialized after the setting information has been exported because the MFP 100A on the exporting side will undergo repairs or be disposed, for example, and will temporarily or permanently be out of use. In FIG. 3(a) the "X" denotes that setting information is initialized.

Note that "initialize" in the embodiment means that setting information is restored to the initial factory settings. Specifically, initial setting information is copied to the NVM 104A of the MFP 100A. The initial setting information is information stored in the ROM 102 or the like that the operator cannot modify.

Figure 3B:
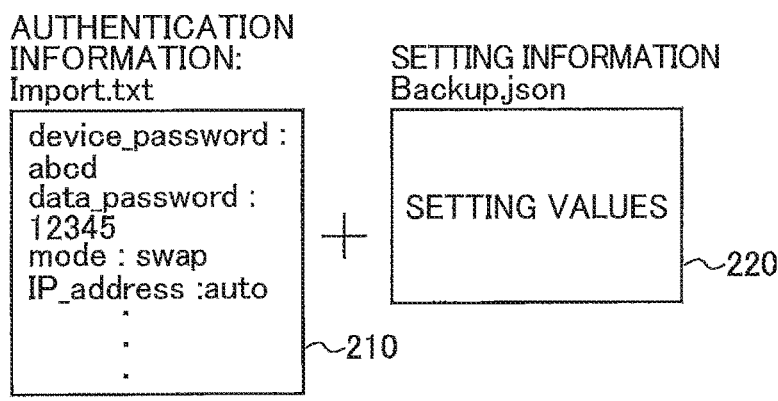
FIG. 3(b) is an explanatory diagram illustrating authentication information and the setting information stored in the USB memory according to the swap mode.

FIG. 3(b) shows examples of authentication information 210 and setting information 220 stored in the USB memory 200 when the swap mode is selected.

The authentication information 210 is stored in the USB memory 200 with the filename "Import.txt." The authentication information 210 includes a device password, a data password, and configuration mode information. The configuration mode information is instruction information indicating a configuration mode. The device password is used for logging in to the MFP to which the USB memory 200 is connected. The data password is used for decrypting setting information that was encrypted when exported, in order to import the setting information.

In the Import.txt file shown in the example of FIG. 3(b), the device password is listed as "device_password:abcd," the data password is listed as "data_password:12345," and the configuration mode information is given as "mode: swap" and the IP address is given as "IP_address:auto." Here, "swap" denotes the swap mode. That is, "mode:swap" is an instruction included in the instruction information to use the swap mode. Further, "auto" indicates a setting in which the IP address is automatically assigned (hereinafter called "dynamically assigned") by a router, for example. The opposite meaning of dynamically assigned is statically assigned. With a static assignment, the IP address is set permanently. In the embodiment, an opposite term for "auto" is not used. Thus, the omission of "IP_address:auto" from the Import.txt file signifies that the IP address has been statically assigned.

The setting information 220 in the example of FIG. 3(b) is the same setting information 220 shown in FIG. 2. The setting information 220 is stored in the USB memory 200 with the filename "Backup.json." The setting information 220 is the current setting information for the MFP 100A that has been exported. The setting information 220 is setting information to be imported into the MFP 100B. Since the setting information 220 was described above in detail, a description of the setting information 220 will not be repeated here.

Figure 3C:
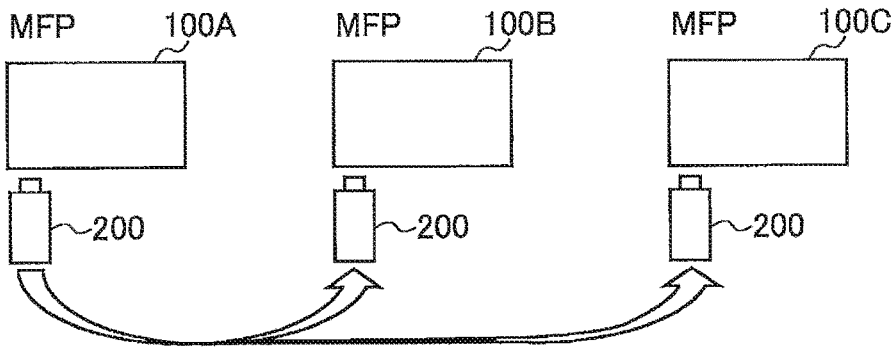
FIG. 3(c) is an explanatory diagram illustrating how setting information is exported from a multifunction peripheral and imported to another multifunction peripheral according to a copy mode.

The copy mode, on the other hand, is a configuration mode for exporting setting information from one MFP and importing the extracted setting information into other MFPs for the purpose of using the same setting values from the first MFP on the other MFPs. Here, the "same setting values" includes the meaning of setting values that are not completely identical but that match except for some items. As will be described later, settings for some setting items cannot be imported as is, depending on the item. FIG. 3(c) illustrates an example of the process performed when the copy mode is selected. In this example, the current setting information for the MFP 100A is exported and stored in the USB memory 200, and subsequently the setting information stored in the USB memory 200 is imported into the MFP 100B and the MFP 100C.

Figure 3D:
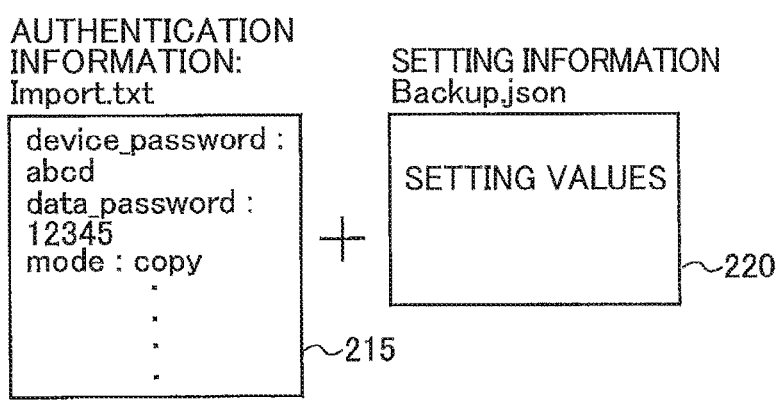
FIG. 3(d) is an explanatory diagram illustrating the authentication information and the setting information stored in the USB memory according to the copy mode.

FIG. 3(d) shows examples of authentication information 215 and setting information 220 stored in the USB memory 200 when the copy mode has been selected.

The authentication information 215 is stored in the USB memory 200 with the filename "Import.txt." The authentication information 215 differs from the authentication information 210 described above in that the configuration mode information includes a different setting from the authentication information 210. In the Import.txt file in the example of FIG. 3(d), the configuration mode information is given as "mode:copy." In other words, "mode:copy" is an instruction included in the instruction information to use the copy mode.

Figure 4:
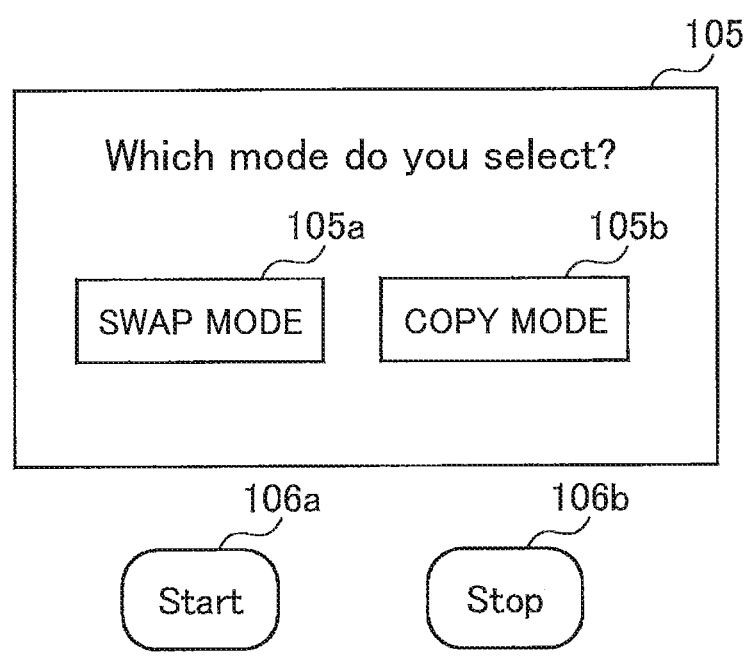
FIG. 4 is an explanatory diagram showing a sample screen displayed on a panel in the multifunction peripheral shown in FIG. 1.

FIG. 4 shows a sample screen displayed on the panel 105 and some of the keys 106. The sample screen displayed on the panel 105 in FIG. 4 is a mode selection screen for selecting either the swap mode or the copy mode as the configuration mode. Within the mode selection screen are displayed a swap button 105a for selecting the swap mode, and a copy button 105b for selecting the copy mode. A Start key 106a and a Stop key 106b among the keys 106 are provided beneath the panel 105.

Next, an export process A and an import process A executed by the MFP 100, and more particularly by the CPU 101, will be described in detail with reference to FIGS. 5 through 7. In the following description, the term "step" indicating each step of the process is abbreviated as "S".

Figure 5:
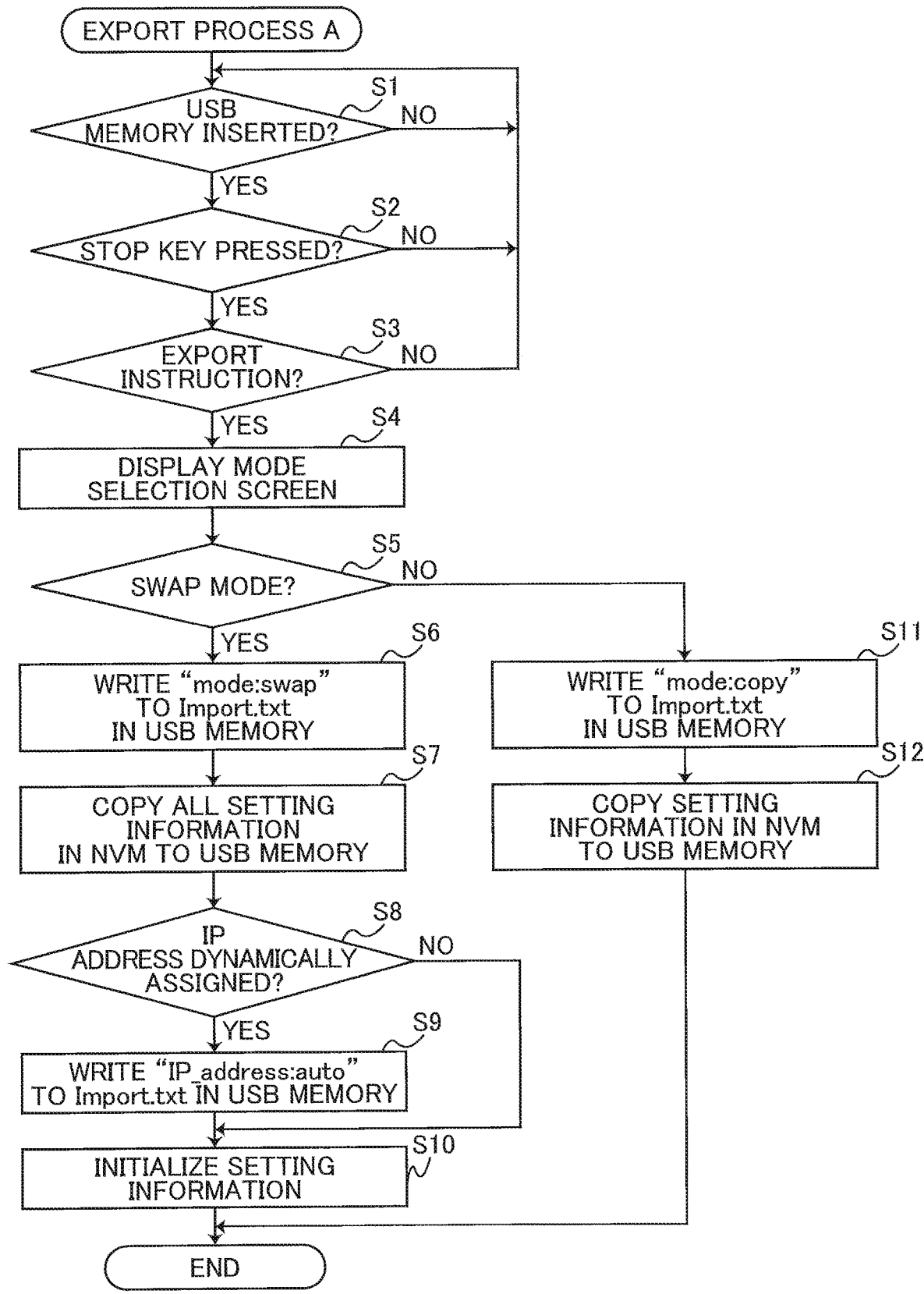
FIG. 5 is a flowchart illustrating the export process executed by a CPU in the multifunction peripheral shown in FIG. 1.

FIG. 5 shows steps in an export process A. At the beginning of the export process A, the CPU 101 waits while a USB memory 200 has not been inserted into the USB interface 107 (S1: NO). When a USB memory 200 is inserted into the USB interface 107 (S1: YES), in S2 the CPU 101 determines whether the Stop key 106b is pressed. Hence, the determinations in S1 and S2 are performed to determine whether the USB memory 200 was inserted into the USB interface 107 while the Stop key 106b was pressed. If a USB memory 200 is connected while the Stop key 106b is pressed, the MFP 100 enters a configuration mode for executing either an export or an import. If the USB memory 200 is connected while the Stop key 106b is not being pressed, the MFP 100 can execute such operations as storing files in the USB memory 200 or reading files from the USB memory 200.

Hence, if the MFP 100 determines that the Stop key 106b is being pressed (S2: YES), in S3 the CPU 101 determines whether an export instruction was issued. Here, an export button (not shown) and an import button (not shown, described later) may be displayed on the panel 105, for example, for issuing an export instruction, and the operator may issue an export instruction by operating the export button. In such a case, the CPU 101 acquires the export instruction from the panel 105.

If the CPU 101 determines in S3 that an export instruction was issued (S3: YES), in S4 the CPU 101 displays the mode selection screen (see FIG. 4) on the panel 105 enabling the operator to choose between swap and copy.

On the other hand, if the CPU 101 determines in S2 that the Stop key 106b is not being pressed (S2: NO) or determines in S3 that an export instruction was not issued (S3: NO), the CPU 101 returns to S1.

In S5 the CPU 101 determines whether the operator pressed the swap button 105a in the mode selection screen to select the swap mode. If the CPU 101 determines that the operator selected the swap mode (S5: YES), the CPU 101 advances to S6. If the CPU 101 determines that the operator pressed the copy button 105b to select the copy mode (S5: NO), the CPU 101 advances to S11.

In S6 the CPU 101 writes "mode:swap" to the Import.txt file stored in the USB memory 200. Note that the device password, data password, and other information were recorded in the Import.txt file and the file was stored in the USB memory 200 prior to the determination in S5 (for example, the information of the Import.txt is stored in the USB memory 200 at a time when executing S4).

In S7 the CPU 101 copies all setting information currently stored in the NVM 104 to the USB memory 200 so that the Backup.json is stored in the USB memory 200 as shown in FIG. 3(b).

In S8 the CPU 101 determines whether the IP address was dynamically assigned. For the determination of S8, the IP address is included in the setting information stored in the NVM 104. The CPU 101 makes the determination of S8 based on the setting information on the IP address in the NVM 104. When the IP address is determined to be dynamically assigned (S8: YES), in S9 the CPU 101 writes "IP_address:auto" to the Import.txt file described above stored in the USB memory 200, and subsequently advances to S10. However, if the CPU 101 determines that the IP address was statically assigned (S8: NO), the CPU 101 skips S9 and advances to S10.

In S10 the CPU 101 initializes the setting information and subsequently ends export process A.

In S11 the CPU 101 writes "mode:copy" to the Import.txt file stored in the USB memory 200. As in the process of S7, in S12 the CPU 101 copies all setting information currently stored in the NVM 104 to the USB memory 200 so that the Backup.json is stored in the USB memory 200 as shown in FIG. 3(d), and subsequently ends the export process A.

Figure 6:
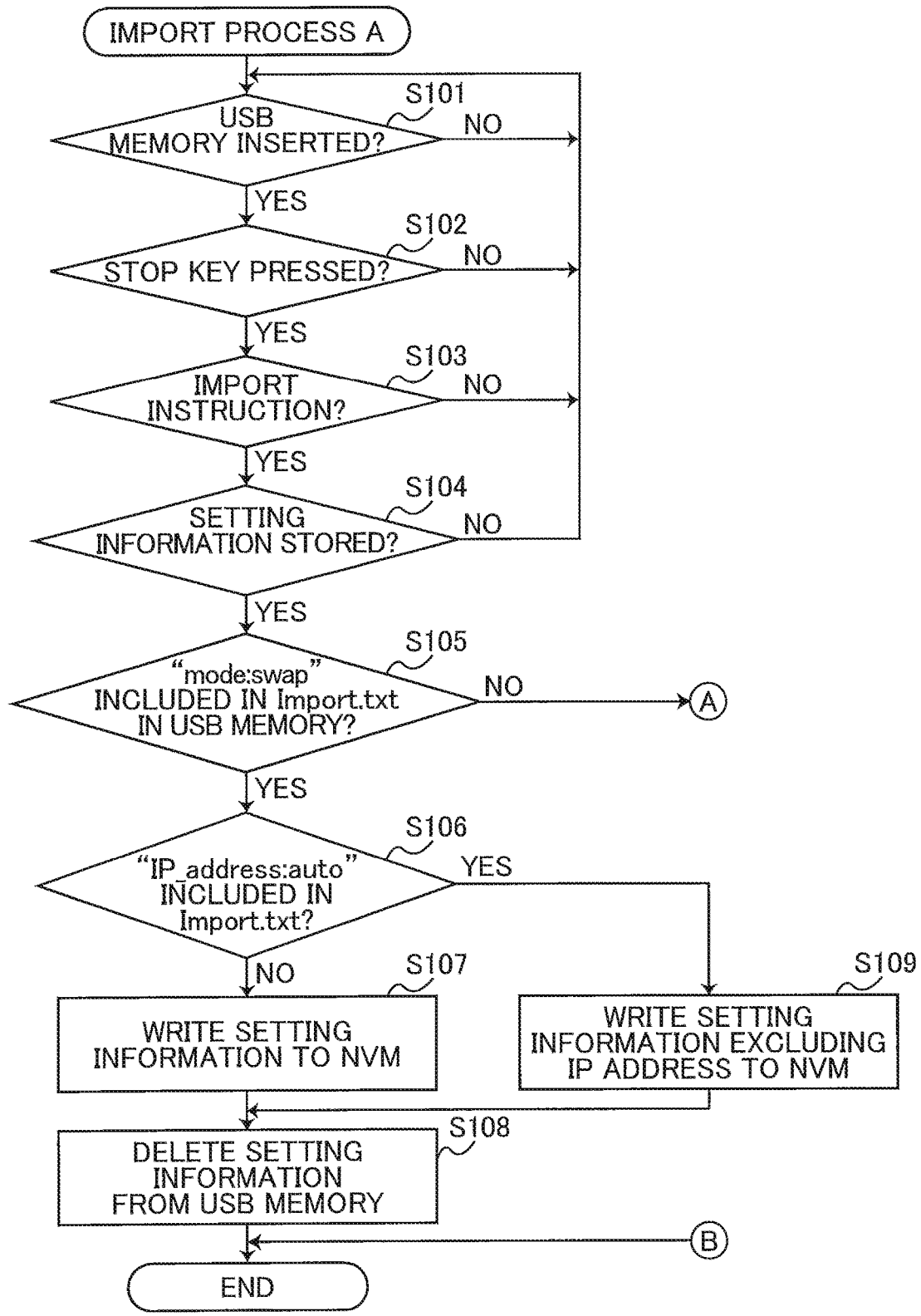
FIG. 6 is a flowchart illustrating a part of the import process executed by the CPU.
Figure 7:
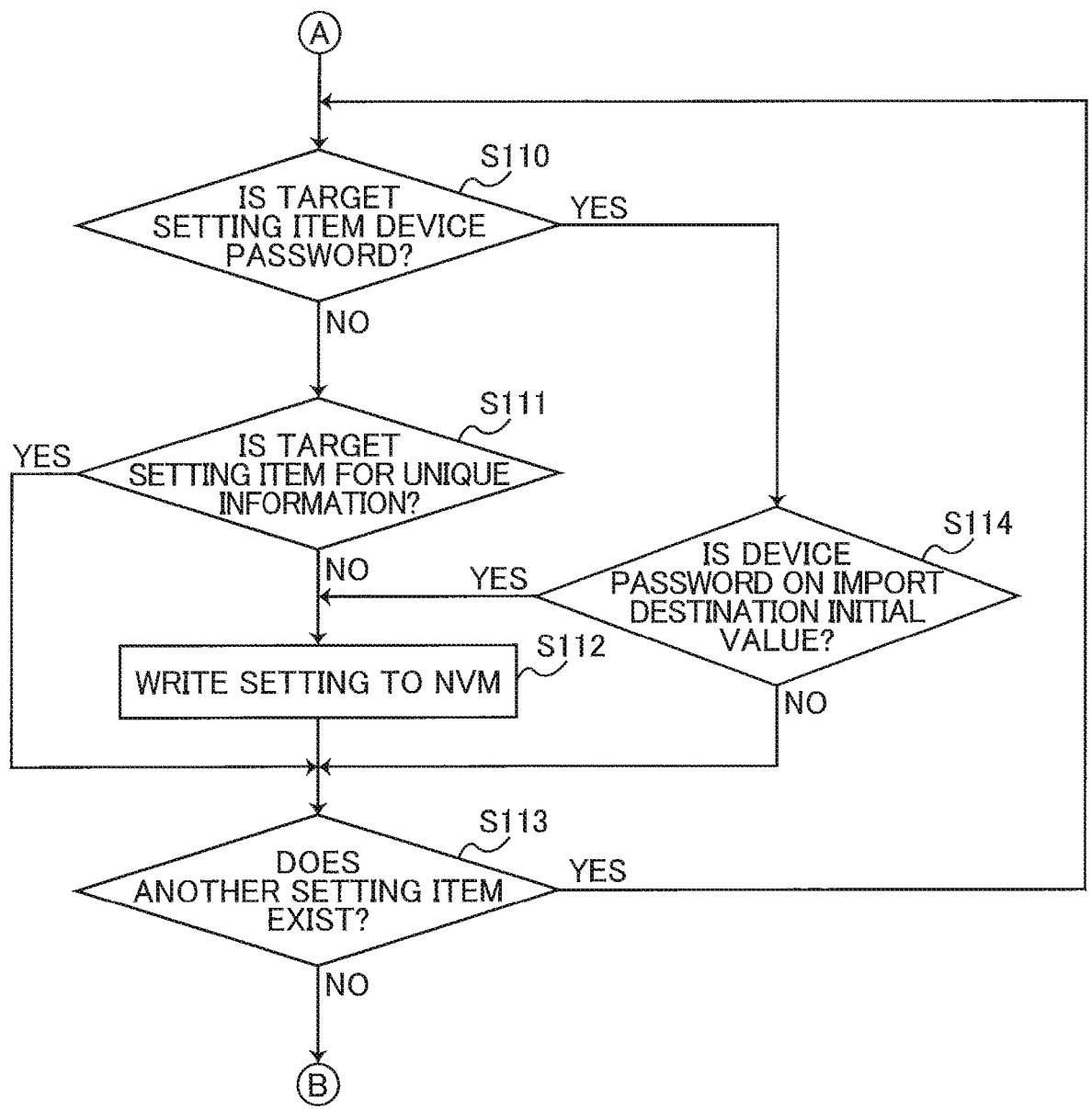
FIG. 7 is a flowchart illustrating a remaining part of the export process shown in FIG. 6.

FIGS. 6 and 7 show steps in an import process A. In S101 and S102 of FIG. 6, the CPU 101 determines whether the USB memory 200 was inserted into the USB interface 107 while the Stop key 106b was being pressed. The CPU 101 advances from S102 to S103 when the USB memory 200 was inserted into the USB interface 107 while the Stop key 106b was being pressed. A more detailed description of the processes in S101 and S102 will be omitted since the processes are identical to those in S1 and S2 described above.

In S103 the CPU 101 determines whether an import instruction was issued. As with the export instruction described above, an import instruction is issued when the import button (not shown) displayed on the panel 105 for issuing an import instruction, for example, is pressed by the operator. In other words, the CPU 101 acquires the import instruction from the panel 105.

If the CPU 101 determines that an import instruction was issued (S103: YES), in S104 the CPU 101 determines whether setting information 220 is currently stored in the USB memory 200.

If the CPU 101 determines that setting information 220 is stored in the USB memory 200 (S104: YES), the CPU 101 advances to S105.

However, if the CPU 101 determines in S103 that an import instruction was not issued (S103: NO) or determines in S104 that setting information 220 is not stored in the USB memory 200 (S104: NO), the CPU 101 returns to S101.

In S105 the CPU 101 determines whether "mode:swap" is listed in the Import.txt file stored in the USB memory 200. This determination is performed to determine whether the configuration mode is the swap mode. If the CPU 101 determines in S105 that "mode:swap" is included in the Import.txt file, i.e., if the CPU 101 determines that the configuration mode is the swap mode (S105: YES), in S106 the CPU 101 determines whether "IP_address:auto" is included in the Import.txt file. This determination is performed to determine whether the IP address setting of the MFP 100 on the exporting side (the MFP 100A in this example) is dynamically assigned or statically assigned.

If the CPU 101 determines in S106 that "IP_address:auto" is included in the Import.txt file, i.e., if the CPU 101 determines that the IP address setting for the MFP 100A is dynamically assigned (S106: YES), in S109 the CPU 101 copies setting information 220 in the Backup.json from the USB memory 200 to the NVM 104, excluding data (the setting value) for the IP address, and subsequently advances to S108. When it is determined that the IP address setting for the MFP 100A is dynamically assigned, data (the setting value) for the IP address is excluded from the imported setting information 220 because there is a very high probability that the IP address in the setting information 220 will change and, consequently, there is a chance of malfunctions occurring after import due to duplicate IP addresses, for example.

On the other hand, if the CPU 101 determines in S106 that "IP_address:auto" is not included in the Import.txt file, i.e., if the CPU 101 determines that the IP address setting for the MFP 100A is statically assigned (S106: NO), in S107 the CPU 101 writes the setting information 220 in the Backup.json from the USB memory 200 to the NVM 104, and subsequently advances to S108.

In S108 the CPU 101 deletes the setting information 220 from the USB memory 200, and subsequently ends the import process A. Deleting setting information 220 from the USB memory 200 can prevent these settings from being imported into other MFPs.

On the other hand, if the CPU 101 determines in S105 that "mode:copy" is included in the Import.txt file, i.e., if the CPU 101 determines that the configuration mode is the copy mode (S105: NO), the CPU 101 advances to S110 in FIG. 7.

The process in S110-S114 is performed in the copy mode to import setting information exported from the MFP 100A into the NVM 104 of an MFP 100 by referring to the Backup.json in the USB memory 200. This process differs from the process described above in S106-S108 in that the CPU 101 determines whether to import a setting value included in the exported setting information for each setting item, and imports the setting value of the setting item when determining that the setting value is to be imported.

In S110 the CPU 101 selects one setting item in the exported setting information to be a target setting item and determines whether the target setting item is the device password. If the CPU 101 determines that the target setting item is the device password (S110: YES), in S114 the CPU 101 determines whether the device password on the import destination (the MFP 100B) has been initialized to an initial value. If the CPU 101 determines that the device password on the MFP 100B is set to the initial value (S114: YES), in S112 the CPU 101 writes the setting value for the target setting item to the corresponding area in the NVM 104.

However, if the CPU 101 determines in S114 that the device password for the MFP 100B is not set to the initial value (S114: NO), the CPU 101 proceeds to S113.

Hence, if the CPU 101 determines in S110 and S114 that a setting item targeted for import is the device password and that a device password has not been set for the destination MFP 100 (the setting is in its initial state), the CPU 101 sets the device password to the device password included in the setting information for importing. However, if a device password different from the initial value has already been set for the destination MFP 100, the CPU 101 leaves that device password unchanged.

However, if the CPU 101 determines in S110 that the target setting item is not the device password (S110: NO), in S111 the CPU 101 determines whether the target setting item is for unique information that specifies a unique value for an individual MFP. Here, unique information may be a network setting, such as an IP address, or a node name. The unique information may be a value that characterizes or specifies an individual MFP. Alternatively, the unique information may be a value which has varied according to operations of the MFP 100, such as information on a history of the MFP 100. More specifically, the unique information may be an amount of print indicating total number of sheets that the print engine 111 has printed.

If the CPU 101 determines in S111 that the target setting item is not unique information (S111: NO), the CPU 101 advances to S112. However, if the CPU 101 determines that the target setting item is unique information (S111: YES), the CPU 101 skips S112 and advances to S113.

In S113 the CPU 101 determines whether another setting item exists. If the CPU 101 determines that another setting item exists (S113: YES), the CPU 101 returns to S110. However, if the CPU 101 determines that no other setting items exist (S113: NO), the CPU 101 ends import process A.

Figure 8:
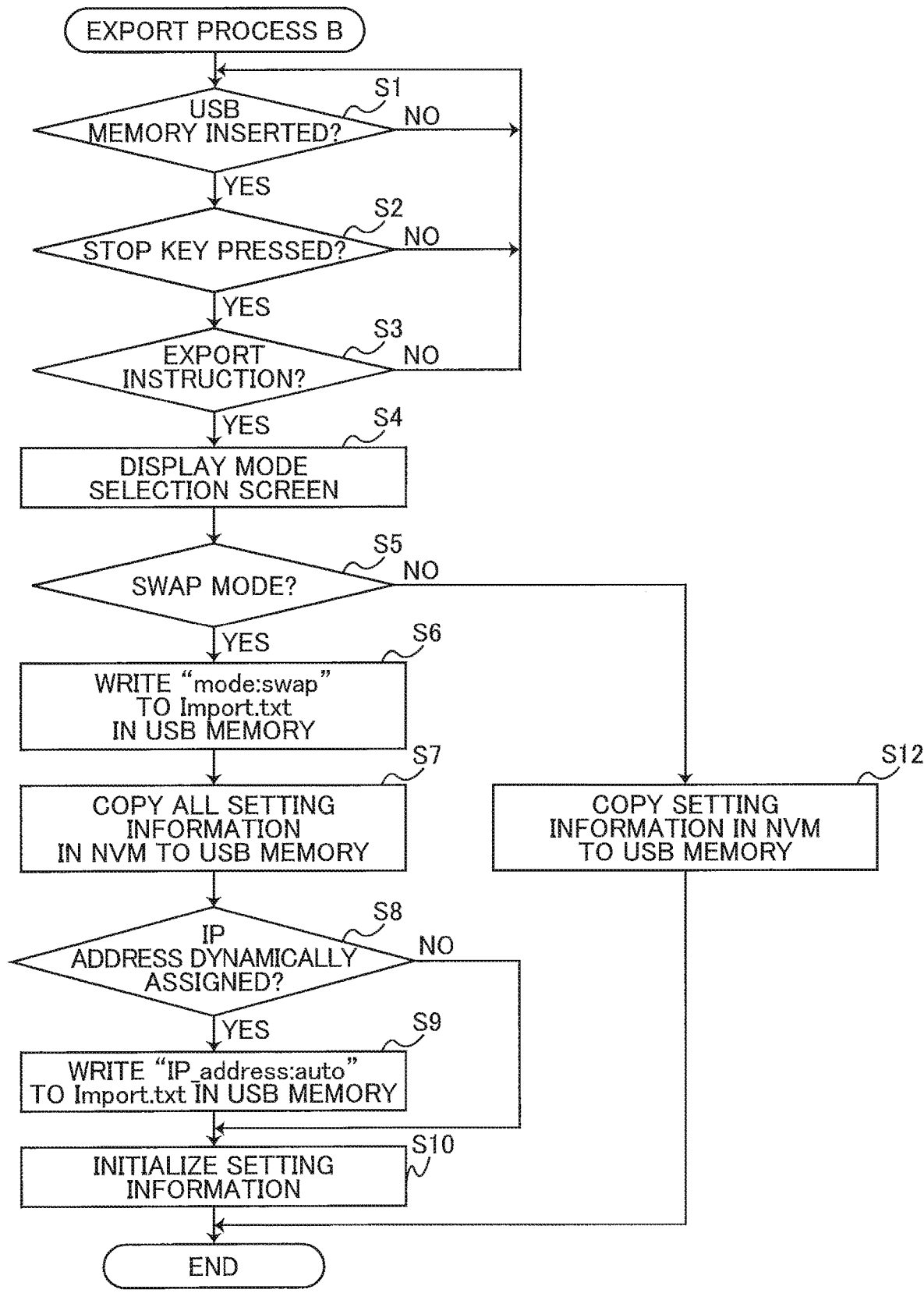
FIG. 8 is a flowchart illustrating another example of an export process executed by the CPU.
Figure 9:
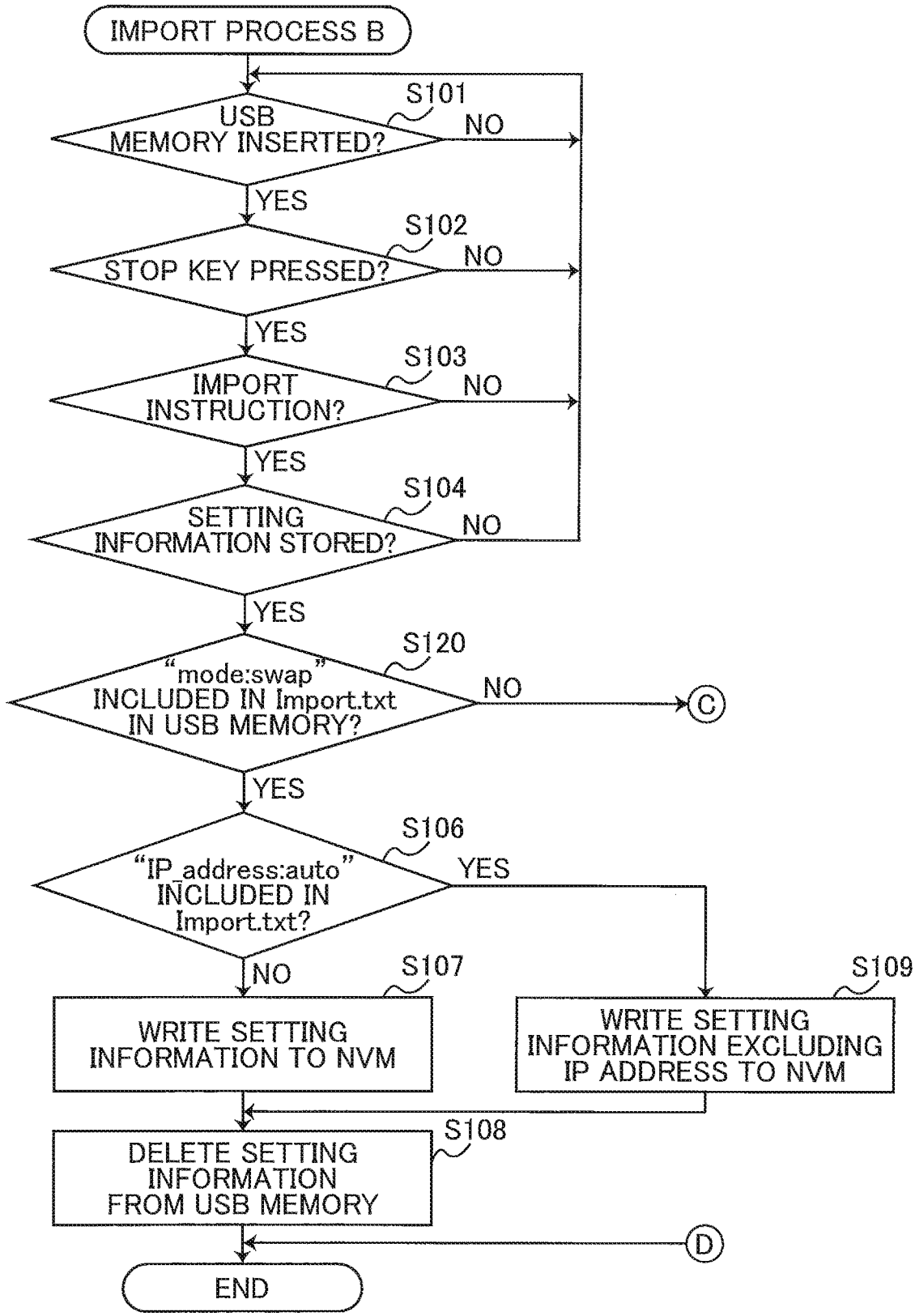
FIG. 9 is a flowchart illustrating a part of another example of an import process executed by the CPU.
Figure 10:
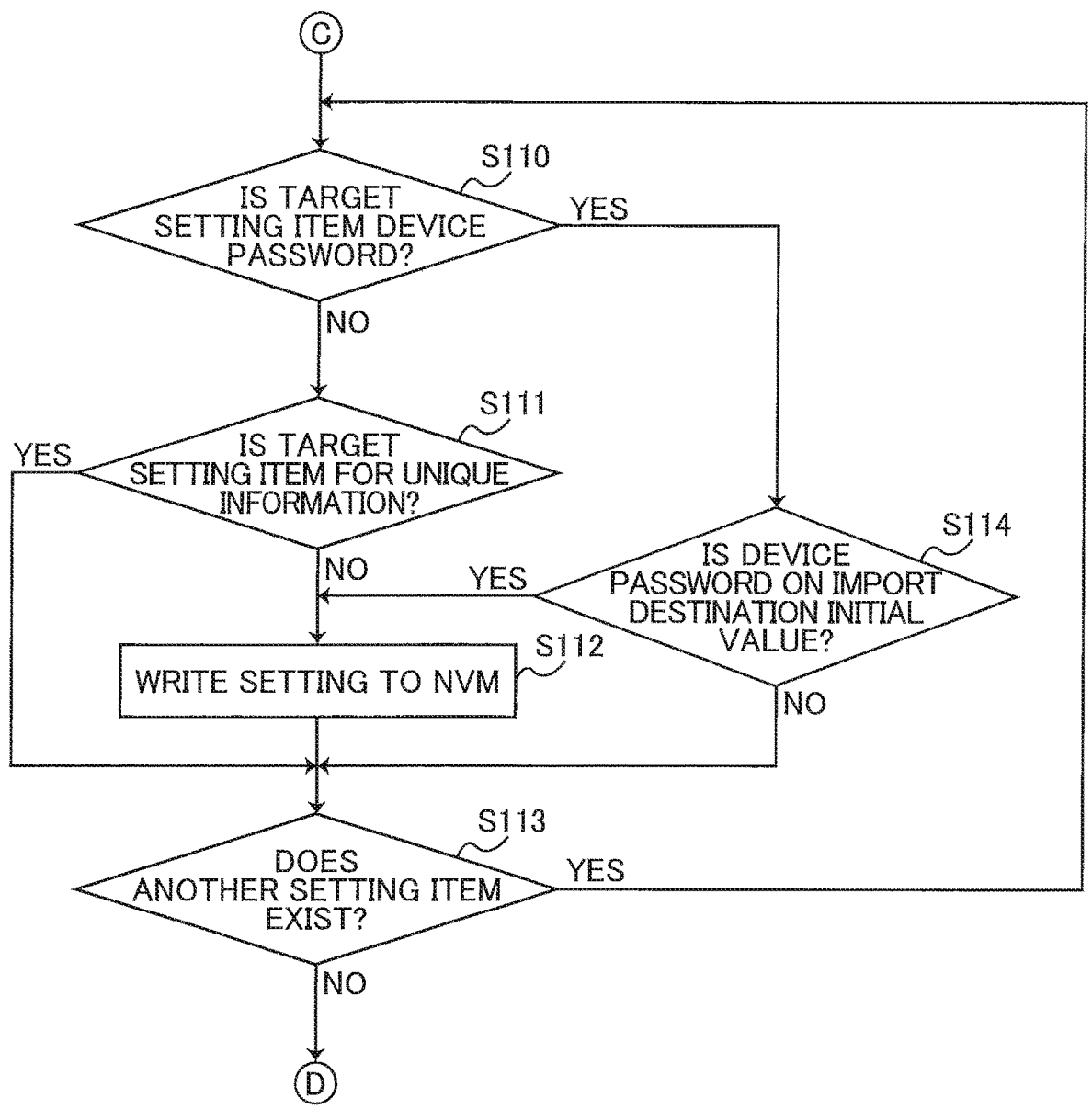
FIG. 10 is a flowchart illustrating a remaining part of the import process shown in FIG. 9.

Next, an export process B and an import process B executed by the MFP 100, and more particularly the CPU 101, will be described in detail with reference to FIGS. 8 through 10. In FIGS. 8 through 10, steps performing similar processes to those in FIGS. 5 through 7 are designated with the same step numbers to avoid duplicating description.

The export process B and the import process B achieve the same effects as the export process A and the import process A, but according to a different method than the processes A.

FIG. 8 shows steps in the export process B. The export process B differs from the export process A in that the process in S11 is omitted. Hence, when the operator has selected the copy mode in the mode selection screen displayed on the panel 105 in the export process B (S5: NO), the CPU 101 does not write anything to the Import.txt file in the USB memory 200.

Accordingly, in S120 of the import process B shown in FIG. 9, the CPU 101 determines whether "mode:swap" is included in the Import.txt file stored in the USB memory 200 or whether no corresponding mode is included. This contrasts with S105 in the import process A of FIG. 6 where the CPU 101 determines whether "mode:swap" is included in the Import.txt file stored in the USB memory 200 or whether "mode:copy" is included in the file. However, the determination in S120 is expressed in the same way as the determination in S105.

Figure 11:
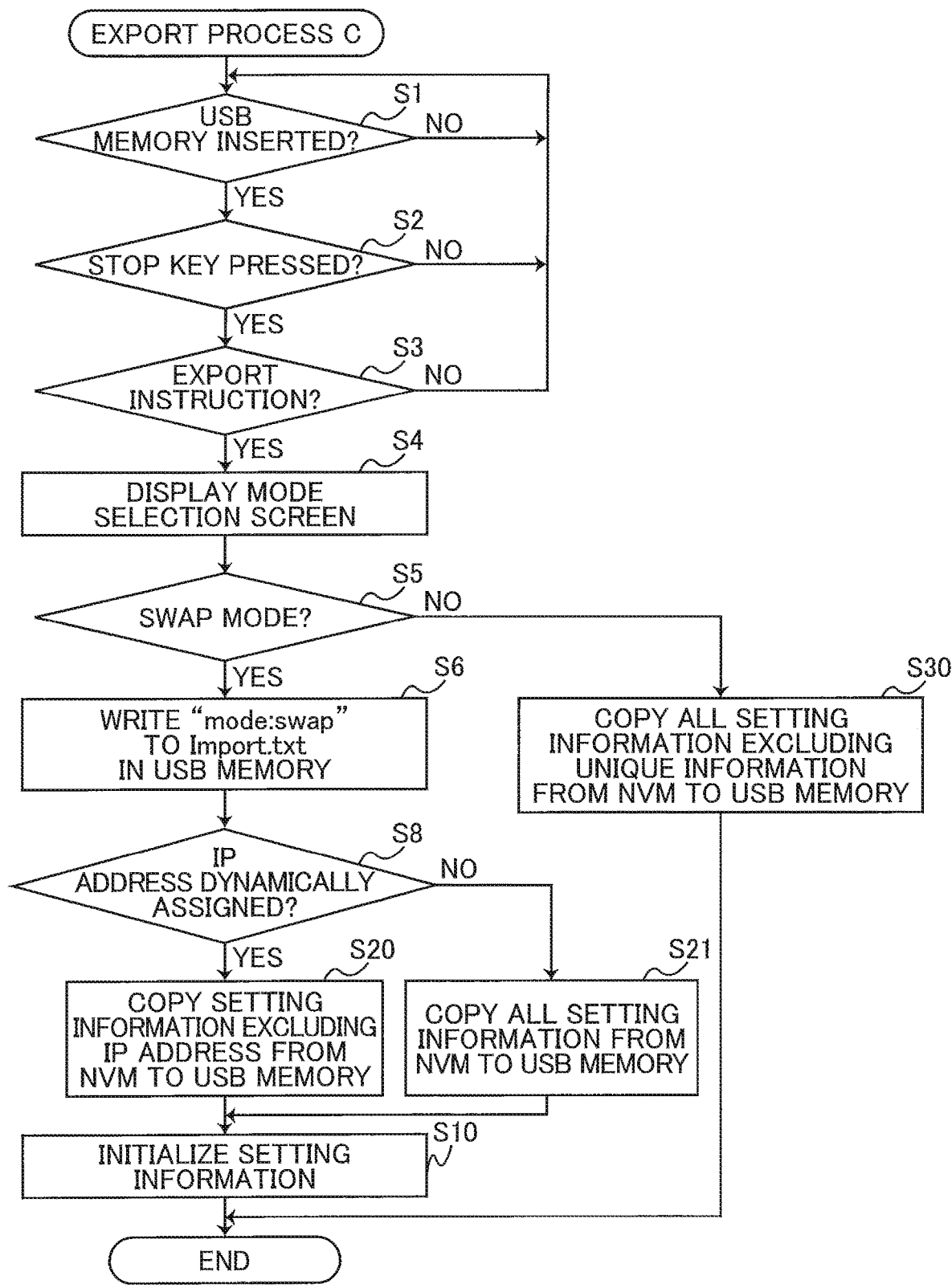
FIG. 11 is a flowchart illustrating still another example of an export process executed by the CPU.
Figure 12:
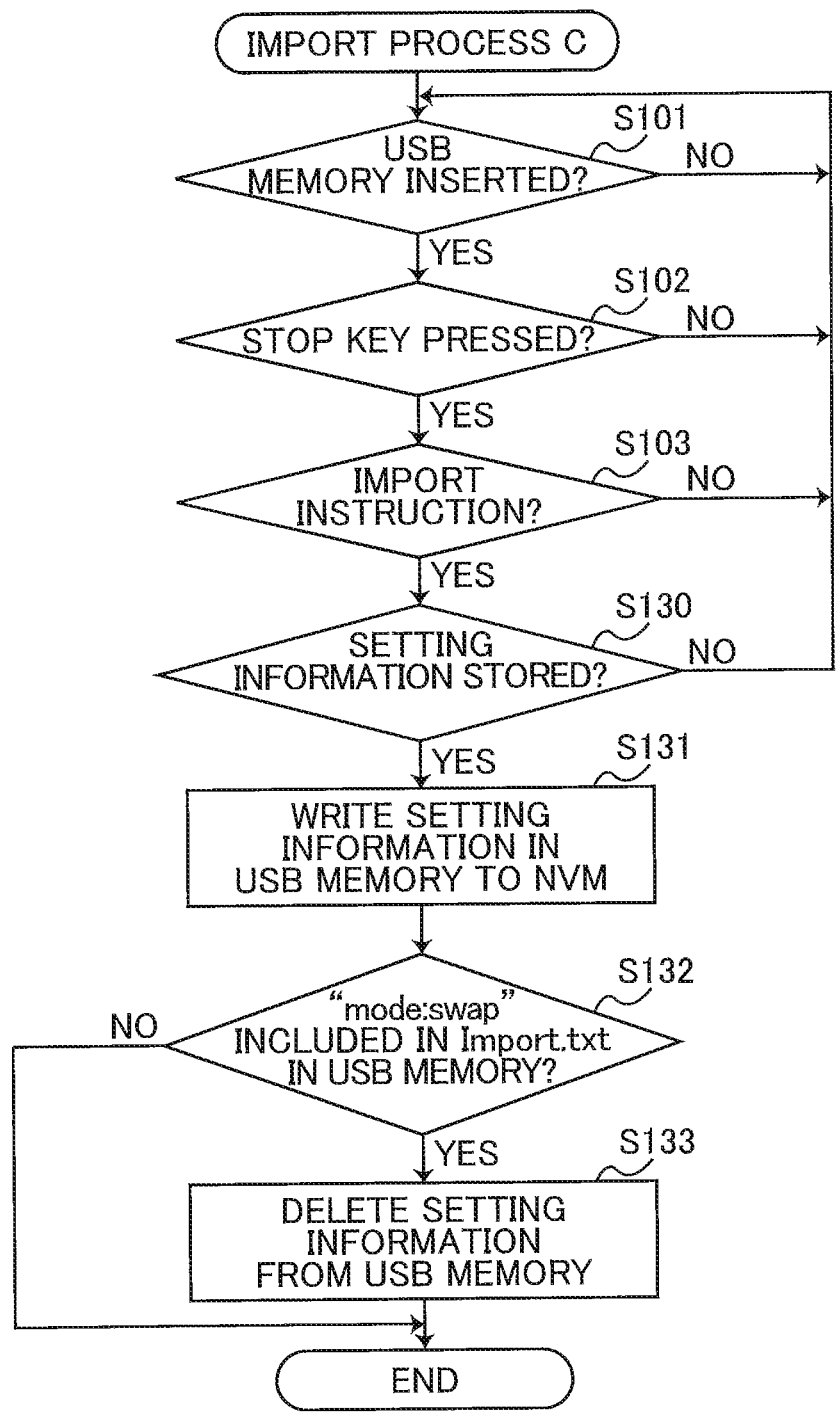
FIG. 12 is a flowchart illustrating a still another example of an import process executed by the CPU.

Next, an export process C and an import process C executed by the MFP 100, and more particularly the CPU 101, will be described in detail with reference to FIGS. 11 and 12. In FIGS. 11 and 12, steps for performing processes identical to those in FIGS. 5 through 7 are designated with the same step numbers to avoid duplicating description.

The export process C and the import process C achieve the same effects as the export process A and the import process A, but through a different method than the processes A.

When the IP address for the MFP 100 on the exporting side (the MFP 100A in this example) is dynamically assigned in the export process A (S8: YES), the CPU 101 writes "IP_address:auto" indicating a dynamic assignment to the Import.txt file in the USB memory 200 (S9). Subsequently, in the import process A described above, the CPU 101 determines whether "IP_address:auto" is included in the Import.txt file stored in the USB memory 200 and determines whether to import all settings information including the IP address based on these determination results (S106).

However, in the export process C of FIG. 11, if the MFP 100 determines that the swap mode was selected (S5: YES) and that the IP address for the MFP 100 on the exporting side (the MFP 100A in this example) is dynamically assigned (S8: YES), in S20 the CPU 101 copies setting information from the NVM 104A to the USB memory 200, excluding the IP address. If the CPU 101 determines that the IP address for the MFP 100A is statically assigned (S8: NO), in S21 the CPU 101 copies all setting information from the NVM 104A to the USB memory 200.

On the other hand, if the copy mode was selected (S5: NO), in S30 the CPU 101 copies all the setting information stored in the NVM 104A to the USB memory 200, excluding unique information representing unique values for individual MFPs.

In the import process C of FIG. 12, if setting information 220 is stored in the USB memory 200 (S130: YES), in S131 the CPU 101 writes the setting information 220 stored in the USB memory 200, as is, to the NVM 104 of the MFP 100 on the importing side (and specifically the NVM 104B of the MFP 100B when the swap mode is selected, or the NVM 104B of the MFP 100B or the NVM 104C of the MFP 100C when the copy mode is selected).

S132 and S133 correspond to S105 and S108 in the import process A of FIGS. 6 and 7 described above. In other words, the process of S132 and S133 is the same as the process from S105 to S108 after eliminating steps S106, S107, S109, and S110-S113.

As described above, the MFP 100 is provided with the NVM 104 that stores setting information, the CPU 101 that operates based on setting information, and the USB interface 107 to which the USB memory 200 is connected.

When the CPU 101 receives an operation for pressing the swap button 105a instructing the CPU 101 to store setting information via the USB interface 107, the CPU 101 stores the current setting information in the NVM 104 on the USB memory 200 via the USB interface 107 (S7) and initializes the current setting information stored in the NVM 104 (S10). If the CPU 101 receives an operation for pressing the copy button 105b instructing the CPU 101 to store setting information in the USB memory 200, the CPU 101 stores the setting information currently stored in the NVM 104 in the USB memory 200 via the USB interface 107 (S12), but does not initialize the current setting information stored in the NVM 104.

In this way, the MFP 100 according to the embodiment can flexibly account for different purposes of setting information when storing setting information in the USB memory 200.

In the embodiment, the MFP 100 is an example of the "information processing device." The NVM 104 is an example of the "memory." The CPU 101 is an example of the "controller." The USB memory 200 is an example of the "external storagemedium." The USB interface 107 is an example of the "input-output interface."

Further, when the CPU 101 receives an operation for pressing the swap button 105a, the CPU 101 stores "mode:swap" in the USB memory 200 via the USB interface 107 to indicate that a process corresponding to the pressed swap button 105a was executed (S6). Here, "mode:swap" is an instruction to use the swap mode.

Further, if the CPU 101 receives an operation for pressing the copy button 105b, the CPU 101 stores "mode:copy" in the USB memory 200 via the USB interface 107 to indicate that a process corresponding to the pressed copy button 105b was executed (S11). Here, "mode:copy" is an instruction to use the copy mode.

If the CPU 101 receives an operation for pressing the swap button 105a while an IP address is stored in the NVM 104, the CPU 101 stores the IP address from the NVM 104 in the USB memory 200 via the USB interface 107 (S21 of FIG. 11). If the CPU 101 receives an operation for pressing the copy button 105b, the CPU 101 does not store the IP address from the NVM 104 in the USB memory 200 (S30).

The IP address is an example of unique information.

When the CPU 101 determines that the IP address was statically assigned (S8: NO), the CPU 101 stores the IP address in the USB memory 200 via the USB interface 107 (S21). If the CPU 101 determines that the IP address was dynamically assigned (S8: YES), the CPU 101 does not store the IP address in the USB memory 200 (S20).

The MFP 100 is further provided with the mode selection screen displayed on the panel 105. The CPU 101 receives operations for pressing the swap button 105a and the copy button 105b from the mode selection screen displayed on the panel 105.

As described above, the MFP 100 according to the embodiment is provided with the CPU 101, and the USB interface 107 to which the USB memory 200 is connected. The USB memory 200 stores setting information 220 for import.

When the CPU 101 receives "mode:swap" instructing the CPU 101 to acquire setting information 220 from the USB memory 200 (S105: YES), the CPU 101 acquires setting information 220 from the USB memory 200 via the USB interface 107 (S107, S109) and deletes the setting information 220 from the USB memory 200 (S108). When the CPU 101 receives "mode:copy" instructing the CPU 101 to acquire setting information 220 from the USB memory 200 (S105: NO), the CPU 101 acquires setting information 220 from the USB memory 200 via the USB interface 107 (S112), but does not delete the setting information 220 from the USB memory 200.

In this way, the MFP 100 according to the embodiment can flexibly handle different purposes for setting information when acquiring setting information 220 stored in the USB memory 200.

If the CPU 101 receives "mode:swap" and the setting information includes an IP address (S105: YES), the CPU 101 sets the IP address included in the setting information 220 acquired from the USB memory 200 as its own IP address (S107). If the CPU 101 receives "mode:copy" (S105: NO), the CPU 101 does not set the IP address included in the setting information 220 acquired from the USB memory 200 as its own IP address (S111:YES).

The MFP 100 is also provided with the mode selection screen displayed on the panel 105. The CPU 101 receives "mode:swap" or "mode:copy" from the mode selection screen displayed on the panel 105.

The CPU 101 also receives "mode:swap" or "mode:copy" from the Import.txt file stored in the USB memory 200 via the USB interface 107.

The MFP 100 is provided with the print engine 111 for printing images on sheets, and the setting information includes information related to print settings for the print engine 111.

The MFP 100 is provided with the read engine 112 for reading images from originals, and the setting information also includes information related to read settings for the read engine 112.

While the disclosure has been described in detail with reference to the above embodiments, it would be apparent to those skilled in the art that various changes and modifications may be made thereto.

(1) In the embodiment, the MFP 100 is provided as an example of the information processing device. However, the information processing device may be an single printer, scanner, or copying machine.

(2) In the embodiment, the MFP 100 does not have a facsimile function. However, the MFP 100 may have the facsimile function.

(3) In the embodiment, the CPU 101 is provided as an example of a controller. However, the controller may include both of a CPU and a dedicated circuit. The dedicated circuit is an Application Specific Integrated Circuit (ASIC) or a Field Programmable Gate Array (FPGA), for example.

(4) In the embodiment, the USB interface 107 is provided as an example of the input-output interface, but the input-output interface may also be a wireless interface, such as a near-field communication (NFC) interface or a Bluetooth (registered trademark) interface. Secure Digital Input Output (SDIO) may also be used as the input-output interface. In these cases, the external storage device is also provided with an interface that is compatible with this network interface.

(5) In the embodiment, the configuration mode is recognized when the USB memory 200 is connected to the MFP 100 while the Stop key 106*b* is being pressed, but the pressed key is not limited to the Stop key. In addition, the export process and the import process are automatically initiated when the configuration mode is recognized in the embodiment while the operator is not notified of what processes have been initiated. However, the operator may first be notified that a process is to be initiated through a prescribed form of notification, after which the process may be initiated automatically or may be initiated once an instruction to start is received from the operator.

What is claimed is:

1. An information-processing device comprising:
   a memory configured to store setting information including an operation setting for the information-processing device;
   an input-output interface; and
   a controller configured to operate according to the setting information, the controller executing selective one of a swap mode and a copy mode, the swap mode being for moving the setting information from one device to another device, the copy mode being for copying the setting information from one device to one or more devices,
   wherein while a removable medium is connected to the input-output interface, the controller is configured to perform:
      in a swap-mode case where the swap mode is executed, storing in the removable medium the setting information currently stored in the memory and overwriting the setting information in the memory to prescribed initial setting information; and
      in a copy-mode case where the copy mode is executed, storing in the removable medium the setting information currently stored in the memory while maintaining the current setting information in the memory.

2. The information-processing device according to claim 1, wherein in the swap-mode case, the controller is configured to further perform storing information indicating the swap mode in the removable medium.

3. The information-processing device according to claim 1, wherein in the copy-mode case, the controller is configured to further perform storing information indicating the copy mode in the removable medium.

4. The information-processing device according to claim 1, wherein the setting information further includes unique information that is uniquely set for an individual device that stores and uses the setting information,
   wherein in the swap-mode case, the controller stores the setting information including the unique information in the removable medium whereas in the copy-mode case, the controller stores in the removable medium the setting information excluding the unique information.

5. The information-processing device according to claim 4, further comprising a network interface,
   wherein the unique information includes network information on the network interface.

6. The information-processing device according to claim 4, further comprising a print engine configured to print an image on a sheet,
   wherein the unique information includes an amount depending on total number of sheets that the print engine has printed.

7. The information-processing device according to claim 1, further comprising an input device configured to receive information,
   wherein the controller is configured to further perform receiving either one of a first instruction to execute the swap mode and a second instruction to execute the copy mode via the input device.

8. The information-processing device according to claim 1, wherein the controller is configured to further perform, in a state where the removable medium is connected to the input-output interface and stores either one of a first instruction to execute the swap mode and a second instruction to execute the copy mode, acquiring the either one of the first instruction and the second instruction from the removable medium.

9. The information-processing device according to claim 1, wherein the input-output interface is a USB interface, and the removable medium is a USB memory.

10. The information-processing device according to claim 1, further comprising a print engine configured to print an image on a sheet,
wherein the current setting information includes a setting value for printing executed by the print engine.

11. An information-processing device comprising:
a memory configured to store setting information including an operation setting for the information-processing device;
an input-output interface; and
a controller configured to operate according to the setting information, the controller executing selective one of a swap mode and a copy mode, the swap mode being for moving the setting information from one device to another device, the copy mode being for copying the setting information from one device to one or more devices,
wherein while a removable medium is connected to the input output interface and stores setting information for import, the controller is configured to perform:
in a swap-mode case where the swap mode is executed, importing the setting information for import from the removable medium to the memory and deleting the setting information from the removable medium; and
in a copy-mode case where the copy mode is executed, importing the setting information for import from the removable medium to the memory while maintaining the setting information in the removable medium.

12. The information-processing device according to claim 11, wherein the setting information further includes unique information that is uniquely set for an individual device that stores and uses the setting information is set,
wherein in the swap-mode case, the controller imports the setting information including the unique information from the removable medium to the memory whereas in the copy-mode case, the controller imports the setting information excluding the unique information from the removable medium to the memory.

13. The information-processing device according to claim 12, further comprising a network interface,
wherein the unique information includes network information on the network interface.

14. The information-processing device according to claim 12, further comprising a print engine configured to print an image on a sheet,
wherein the unique information includes an amount depending on total number of sheets that the print engine has printed.

15. The information-processing device according to claim 11, further comprising an input device configured to receive information,
wherein the controller is configured to further perform receiving either one of a first instruction to execute the swap mode and a second instruction to execute the copy mode via the input device.

16. The information-processing device according to claim 11, wherein the controller is configured to further perform, in a state where the removable medium is connected to the input-output interface and stores either one of a first instruction to execute the swap mode and a second instruction to execute the copy mode, acquiring the either one of the first instruction and the second instruction from the removable medium.

17. A method for controlling an information-processing device including: a memory configured to store setting information including an operation setting for the information-processing device; an input-output interface; and a controller, the method comprising:
executing selective one of a swap mode and a copy mode, the swap mode being for moving the setting information from one device to another device, the copy mode being for copying the setting information from one device to one or more devices; and
while a removable medium is connected to the input-output interface:
in a swap-mode case where the swap mode is executed, storing in the removable medium the setting information currently stored in the memory and overwriting the setting information in the memory to prescribed initial setting information; and
in a copy-mode case where a copy mode is executed is executed, storing in the removable medium the setting information currently stored in the memory while maintaining the current setting information in the memory.

* * * * *